United States Patent [19]
Morgan

[11] Patent Number: 4,503,738
[45] Date of Patent: Mar. 12, 1985

[54] CAN FLANGE TRIMMING

[76] Inventor: Richard P. Morgan, R.D. 2, Box 115, Union, Me. 04862

[21] Appl. No.: 469,906

[22] Filed: Feb. 25, 1983

[51] Int. Cl.³ .............................................. B26D 7/18
[52] U.S. Cl. ........................................ 83/146; 83/104; 83/914
[58] Field of Search ................. 83/104, 914, 140, 146

[56] References Cited
U.S. PATENT DOCUMENTS

| | | |
|---|---|---|
| 1,973,458 | 9/1934 | Yoder . |
| 2,443,336 | 6/1948 | Waldie ................................. 219/3 |
| 3,461,761 | 8/1969 | Mojonnier ...................... 83/914 X |
| 3,589,228 | 6/1971 | Bourgeois ...................... 83/914 X |
| 3,765,785 | 10/1973 | Humphreys et al. ................. 408/1 |

*Primary Examiner*—Donald R. Schran
*Attorney, Agent, or Firm*—W. R. Hulbert

[57] ABSTRACT

Mechanism for locating preformed, open-mouthed cans for the trimming of their flanges, featuring spring-hinged grooved, flange-holding jaws releasably locating cans for the advancing punch and serving to strip the trim from the punch on its return stroke.

7 Claims, 6 Drawing Figures

CAN FLANGE TRIMMING

BACKGROUND OF THE INVENTION

This invention relates to trimming of flanges of preformed, open-mouth cans, such as sardine cans. In conventional machines used for this purpose the preformed, open-mouth cans are fed successively to a trimming station where they are picked up by a punch and propelled through a die, the punch and the die coacting to trim the flanges to predetermined dimensions. Existing can-locating mechanisms hold the can by the body walls, thus requiring that they be withdrawn laterally before the advancing punch and thus do not provide positive location at moment of contact by punch. Slide action jaw mechanisms are subject to excessive wear and shock fatigue, stripping of trim from punch on return stroke has been accomplished with additional independent mechanisms.

It is the primary objective of the invention to overcome the difficulties just mentioned and to provide a simple device which will receive and hold the open-mouth cans at the right position at the trimming station, release them to the advancing punch without auxiliary linkage and strip the trim from the retracting punch thereby permitting greatly increased production on existing machines.

SUMMARY OF THE INVENTION

In accordance with the invention there is provided in a machine for trimming flanges from the edges of preformed open-mouth cans wherein the cans are fed in succession to a trimming station where a reciprocating punch propels them successively through a die, the punch coacting with the die to shear off the flanges to a predetermined dimension, the following improvement facilitating release of each can to the punch for trimming on the forward stroke of the punch and stripping from the punch of the trim on its return stroke: A pair of opposed hinged, grooved flange-holding jaw members is mounted with their grooves facing each other in a transverse plane between the retracted punch and the die. The grooved jaws are adapted to: initially receive and hold the cans by their untrimmed flanges; secondly swing simultaneously toward the die by motion of the can as it is propelled toward the die by the punch during its forward stroke, releasing the can for trimming without lateral retraction of the jaws; and thirdly to return to their first positions in the original plane after releasing the cans, whereby during the return stroke of the punch they serve to strip the trim from the latter.

In preferred embodiments, the flange-holding jaw members are spring pressed toward their original positions in the plane; the punch is mounted for horizontal movement and the open-mouth cans are fed vertically downwardly guided by their flanges to the trimming station so that the flanges will drop into the grooves; the jaw members are hingedly mounted on an apertured mounting plate with their grooves facing each other on either side of a punch accommodating aperture, the plate being disposed in front of the die; an adjustable stop member is mounted on the plate beneath the aperture for vertically positioning the cans in relation to the punch and die; the jaws are laterally adjustable to accomodate them to predetermined flange widths; and the machine is so disposed and arranged that the stripped trim will fall by gravity from the trimming station with optional air pressure assist while the trimmed cans are ejected horizonally from the punch at the end of its stroke on the far side of the die; and the open-mouth cans are fed vertically downwardly by a contoured non-scratching plastic, spring-loaded feed finger past a single non-scratching plastic spring-loaded pall which serves to restrain the flow of cans into the can-holding mechanism.

Still further objects, features and advantages of the invention will become apparent from the following detailed description of a preferred embodiment thereof taken in conjunction with the accompanying drawings.

DETAILED DESCRIPTION OF PREFERRED EMBODIMENT

Figure 1:
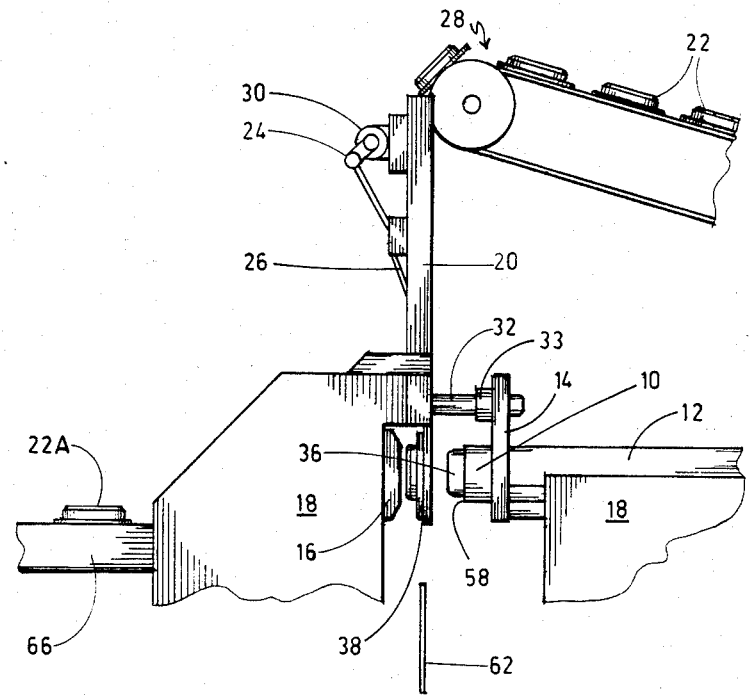
FIG. 1 is a side elevation, partially in section, of the working elements of a can trimming machine incorporating the invention.

The general arrangement of the working parts of a known flange trimmer to which the can holding and trim stripping device of the invention has been applied is illustrated in FIG. 1. A horizontally reciprocating punch 10 is mounted on punch shoe 14 which in turn is mounted on ram 12 and slides backward and forward in V ways in frame 18 and is guided by a pair of leader pins 32 and bushings 33. A die 16 is suitably mounted to frame 18 upwardly from which extends a chute 20 down which the open-mouth already formed cans 22 are fed vertically downwardly by crank 24 and pusher 26 as received from conveyor 28 which receives them from the blanking and forming machine (not shown). The pusher is desirably a contoured, non-scratching, plastic, spring-load feed finger which pushes each can past a non-scratching, spring-loaded pall which serves to restrain the flow of cans into the can-holding and locating mechanism. The crank 24 is operated by wheel 30 driven by a suitable drive (not shown). The punch shoe 14 slides on leader pin 32 suitably held to frame 18.

Figure 2:
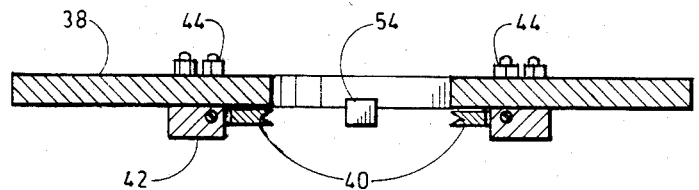
FIG. 2 is a vertical section on a somewhat larger scale than FIG. 1 taken on line 2—2 of FIG. 3.
Figure 3:
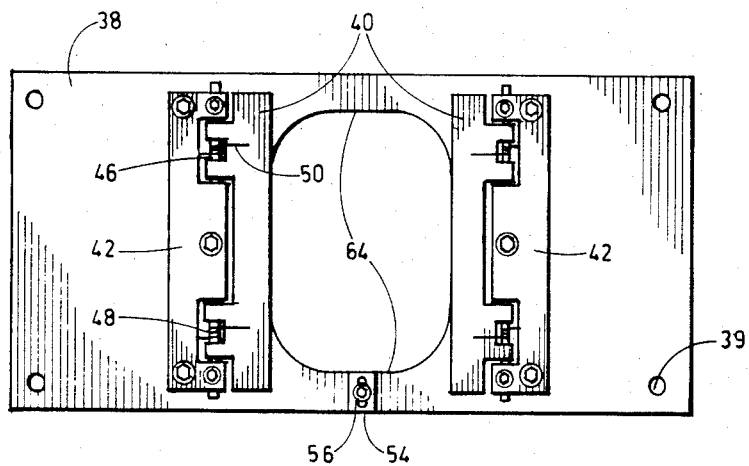
FIG. 3 is an elevation of the apertured mounting plate and hinged and grooved jaws of the invention.

Between the nose 36 of the punch 10, when it is in its retracted position shown in FIG. 1, and the die 16, is mounted by bolting it to parts of the frame not shown utilizing mounting hole 39 a transverse apertured plate 38, which is shown in greater detail in FIGS. 2 and 3. Bolted to the plate 38 is a pair of hinged, grooved jaws 40. Each jaw is suitably hinged to a fixed member 42 which, in turn, is firmly but adjustably bolted by bolts 44 to the plate 38. Hinge pins 46 carry torsion springs 48 whose arms 50 urge the jaws 40 to their retracted positions shown in FIGS. 2 and 3. The mechanism comprising the window plate with jaws lies in a plane between punch and die and perpendicular to the action of the die set. It is to be noted that the jaw members can swing from their rest position only toward and away from the die and cannot be struck by the punch in any position.

Figure 4:
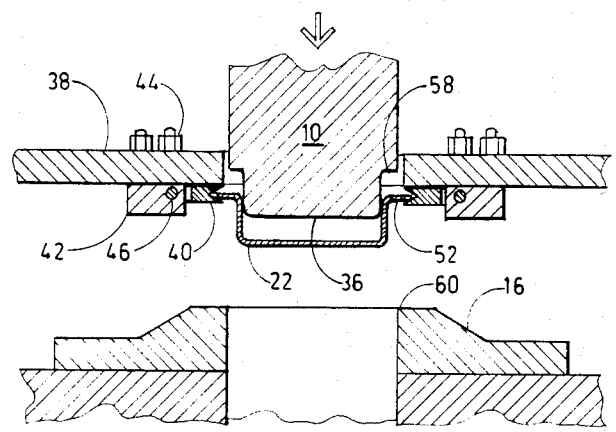
FIGS. 4, 5 and 6 are somewhat diagramatic fragmentary sectional views showing successive operations of the reciprocating punch and of the hinged jaws of the invention, first to receive and releasably hold an open-mouth can to be picked up by the punch, thereafter to be trimmed by the die during forward motion of the punch, and then, after returning to their original position, to strip the trim from the retracting punch.
Figure 5:
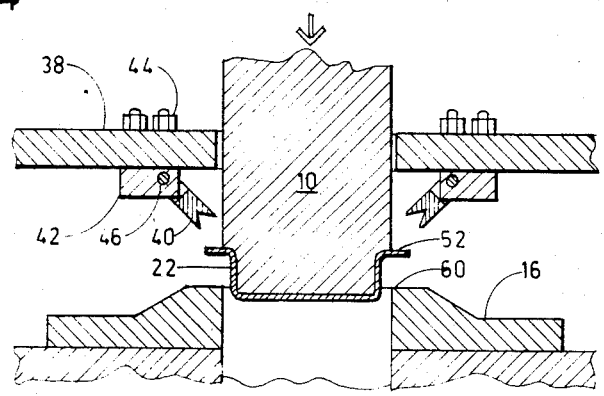
Figure 6:
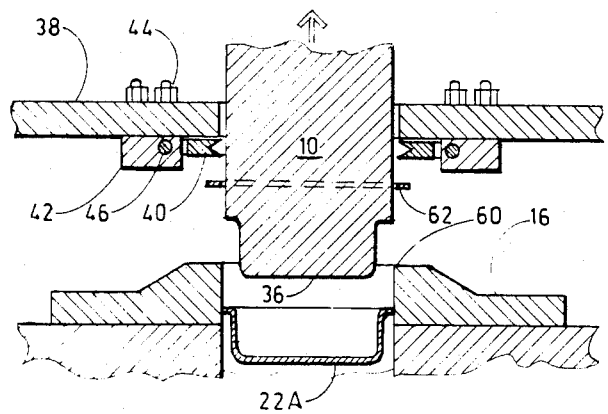

Turning now to FIGS. 4–6, the operation of the novel device of the invention will be explained. An open-mouth can 22 has been fed downwardly and has dropped, guided by its flanges, into trimming position where it is held by its flanges 52, which need to be trimmed, in the grooves of jaws 40. Downward movement of the can is halted by vertically adjustable stop member 54 (FIG. 3) on the plate 38 which is mounted by bolt 56 such that its upper can-engaging edge can be adjusted up or down to position cans of different flange sizes in the proper location for trimming. The punch 10 carries a cutting shoulder 58 adapted to engage the inner portion of the flange 52 and to cooperate with die edge 60 to shear off the desired amount of trim 62 (FIG. 6) from the flange 52. In FIG. 4 the punch has advanced from its original retracted position of FIG. 1 through the window 64 in plate 38 and is about to engage the can 22. In FIG. 5 the punch has advanced further, seating itself in the hollow of the can and with its shoulder 58 engaging the inner portion of the as yet untrimmed flange 52. At this point the punch has carried the can forwardly toward the die 16 and the can flange has been released by reason of the forward swinging of the hinged jaws 40 against the force of the springs 48 (FIG. 3). Next, the punch 10 passes through the die 16 and the flange is trimmed by the cooperative shearing action of edges 60 and 58 in a conventional manner. The trim 62 remains on the punch as seen in FIG. 6 wherein the punch has started its return trip carrying with it the trim. The trimmed can 22a is ejected from the machine (horizontally to the left as seen in FIG. 1) to be carried away by a second conveyor 66. The retracted jaws strip the trim 62 from the punch 10 as the latter withdraws through window 64 and the trim drops out of the machine by gravity (FIG. 1) or gravity plus air blast by conventional means not shown.

The concept of flange-holding can location mechanisms has been rejected before this invention based on the premise that can flange dimension variations would require too-frequent adjustment. It has been determined by experimentation with the mechanism of this invention that the adjustment of jaws laterally and the bottom stop vertically will last the full cycle of useful sharpness of the primary punch and forming die set which blanks and molds the can. When the cans do bind in this invention's trimmer jaw grooves, sharpening the primary punch and/or die is indicated, and will usually eliminate binding in the jaws with no other adjustment.

From the foregoing it will be seen that the invention provides in a simple attachment for a can trimming machine means for releasably holding the can to be trimmed so it can be picked up by a reciprocating punch, the same means serving on the return stroke to strip the trim from the punch so that it may drop by gravity to a suitable collector beneath the trimming station.

The foregoing description of a preferred embodiment of the invention is given by way of illustration and not by way of limitation and it is intended the scope of the invention be measured only by the proper interpretation to be afforded the appended claims.

I claim:

1. In a machine for trimming flanges from the edges of preformed open mouth cans wherein the cans are fed in succession to a trimming station where a reciprocating punch propels them successively through a die, the punch coacting with the die to shear off the flanges to predetermined dimensions, the improvement facilitating release of each can for trimming on the forward stroke of the punch and stripping from the punch of the trim on its return stroke, comprising a pair of opposed, hinged, grooved, flange-holding jaw members mounted with their grooves facing each other in a transverse plane between the retracted punch and the die, the grooved jaws being adapted initially to receive and hold the cans by their untrimmed flanges, to swing simultaneously toward said die by motion of said can as it is propelled toward said die during the forward stroke of said punch releasing the can for trimming without lateral retraction of jaw members, and to return to their original positions in said plane after releasing the cans, whereby during the return stroke of said punch they serve to strip the trim from the latter.

2. The machine of claim 1 wherein said flange-holding jaw members are spring pressed toward their original positions in said plane.

3. The machine of claim 1 wherein said punch is mounted for horizontal movement and said open mouth cans are fed vertically downwardly guided by their flanges to said trimming station so that said flanges drop into said grooves.

4. The machine of claim 3 wherein said jaw members are hingedly mounted on a windowed mounting plate with their grooves facing each other on either side of a punch accomodating aperture, said plate being disposed in front of said die.

5. The machine of claim 4 including an adjustable stop member mounted on said plate beneath said window for vertically positioning the cans.

6. The machine of claim 4 or claim 5 wherein said jaws are laterally adjustable to accomodate them to predetermined flange widths.

7. The machine of claim 3 so disposed and arranged that the stripped trim will fall from the trimming station while the trimmed cans are ejected horizontally from the far side of said die.

* * * * *